Aug. 28, 1945.    C. B. HUSTON    2,383,799
CONTROL SYSTEM
Filed July 28, 1943
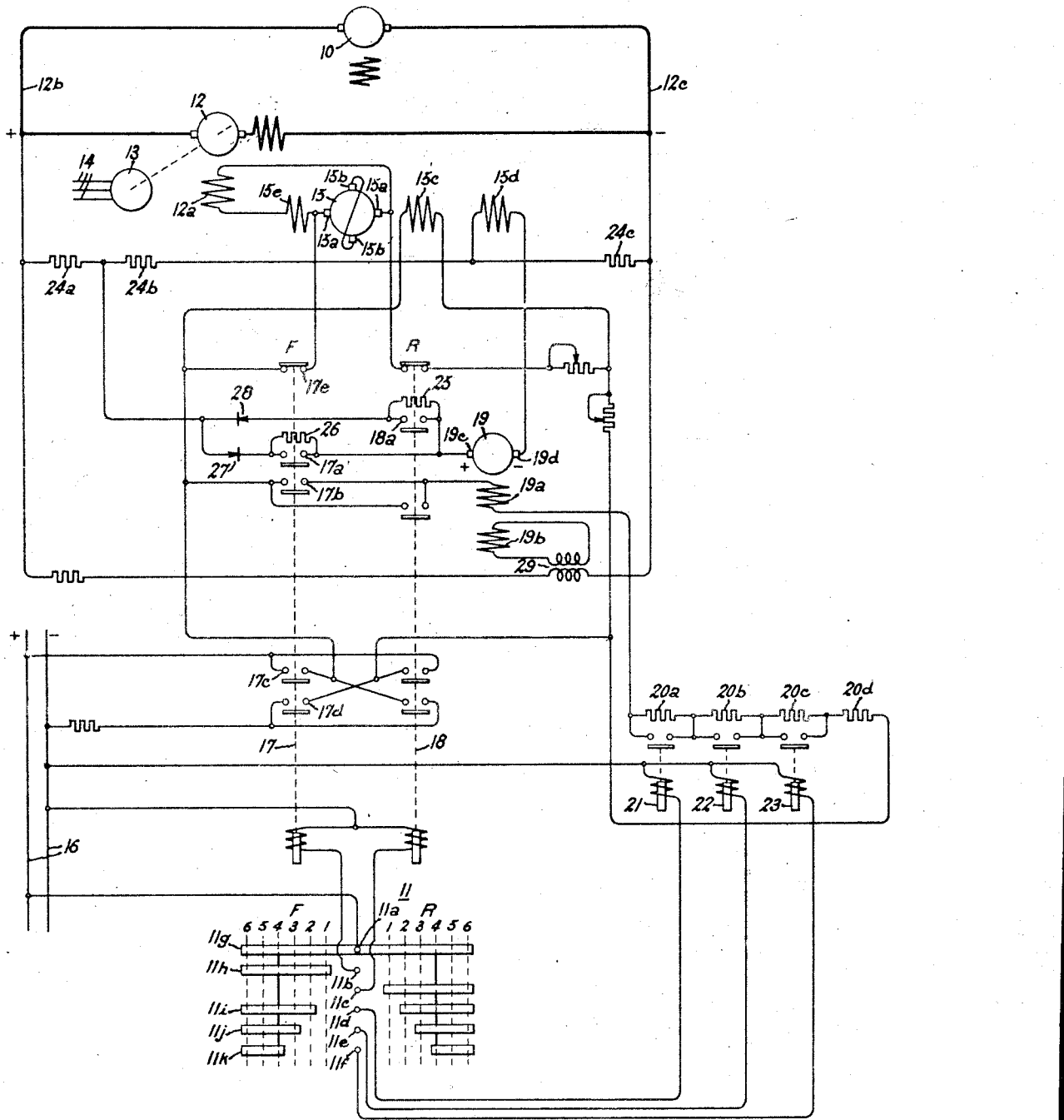
Inventor:
Claude B. Huston,
by Harry E. Dunham
His Attorney.

Patented Aug. 28, 1945

2,383,799

UNITED STATES PATENT OFFICE 2,383,799

CONTROL SYSTEM

Claude B. Huston, Schenectady, N. Y., assignor to General Electric Company, a corporation of New York Application July 28, 1943, Serial No. 496,435

6 Claims. (Cl. 171—225)

This invention relates to control systems, more particularly to systems for controlling the operation of a dynamoelectric machine, and it has for an object the provision of a simple, reliable, and improved control system of this character.

More specifically, the invention relates to systems for controlling the excitation of a dynamoelectric machine, and a further object of the invention is the provision of a simple and effective means for forcing the excitation of such a machine for the purpose of producing rapid changes in an operating characteristic of such machine.

Another and more specific object of the invention is the provision of means for preventing such forcing action from causing the controlled characteristic of the machine to overshoot a predetermined, desired limiting value.

In carrying the invention into effect in one form thereof, an exciter is provided for the field winding of a main dynamoelectric machine. This exciter is provided with a control field winding which is energized by the difference between a reference voltage and a voltage that is derived from the main dynamoelectric machine. Relatively high and relatively low resistance paths are connected in parallel in the circuit of this control field winding, and rectifiers are also included in this circuit which permit this difference voltage to supply excitation currents through the high resistance path to the control field winding to force the excitation of the main machine when the derived voltage is less than the reference voltage. These rectifiers also prevent current being supplied through the low resistance path during such forcing action.

For the purpose of preventing this forcing action from causing the controlled characteristic to "overshoot" a predetermined desired value, the reference voltage may be modified by the secondary voltage of a transformer of which the primary winding is connected to be energized by the characteristic of the main machine which is being controlled. If the source of reference voltage is a pilot dynamoelectric machine, it may be provided with an auxiliary winding which is supplied from the secondary winding of the transformer.

The invention is particularly useful for controlling the operations of motors which are utilized to drive blooming mills and other types of reversing mills, in the operation of which speed of reversal is an important factor. The motors used in such service are usually supplied from an adjustable voltage generator, and a substantial portion of the acceleration of the motor from rest during such reversal is brought about by varying the voltage of the generator. In order that the rate of acceleration shall be in keeping with the requirements of the mill, a simple and efficient means is provided for forcing the excitation of the supply generator to rise rapidly without the use of resistors in the generator field circuit and the loss of power in such resistors when the motor is not accelerating.

In illustrating the invention in one form thereof, it is shown as embodied in a control system such as would be useful for controlling the operations of a motor which drives a blooming mill.

For a better and more complete understanding of the invention, reference should now be had to the following specification and to the accompanying drawing of which the single figure is a simple, diagrammatical sketch of an embodiment of the invention.

Referring now to the drawing, an electric motor 10 is connected to drive the rolls of a blooming mill and is to be started, accelerated, decelerated, stopped, and reversed under the control of a master switch 11 which is illustrated as a multiposition reversing type master switch.

The armature of motor 10 is connected in a closed loop circuit with the armature of an adjustable voltage generator 12 which is driven at a speed that is preferably substantially constant by means of an alternating current induction motor 13. This motor is supplied from a suitable source which is represented by the three supply lines 14.

Generator 12 is provided with a main separately excited field winding 12a, the excitation of which is controlled by suitable means illustrated as an armature reaction excited dynamoelectric machine 15. Dynamoelectric machine 15 is driven at a speed which is substantially constant by any suitable driving means, such, for example, as an induction motor (not shown). The dynamoelectric machine 15 has two sets of brushes. One set of brushes 15a is connected to an external load which in this case is the separately excited field winding 12a of the supply generator. The other set of brushes 15b is short circuited. The axis of the flux which is produced by the current flowing in the short circuited armature conductors is referred to as the short circuit axis, and the axis which is displaced 90 electrical degrees from the short circuit axis is referred to as the control axis. The load brushes 15a are on the control axis. The net flux along the control axis is produced by two opposing control field windings 15c and 15d, a series compensating field winding 15e, and the armature reaction of the load current.

The field winding 15c of the exciting dynamoelectric machine 15 is the main control field winding. It is supplied from a suitable source of direct current excitation which is represented in the drawing by the two conductors 16. The polarity of the excitation of the control field winding 15c is controlled by means of a pair of reversing contactors 17 and 18, the selective operation of which is under the control of the master switch 11. Since the polarity of the voltage of the supply generator 12 and ultimately the direction of rotation of the mill motor 10 depend upon the polarity of excitation of the main control field winding 15c, the latter is also referred to as the directional control field winding. Two important operating characteristics of the exciting dynamoelectric machine 15 which result from the structure described in the foregoing are its exceptionally high speed of response and its high amplification factor, i. e., the ratio between the net excitation along the control axis and the current flowing in the load circuit. The voltage control field winding 15d of the exciting machine 15 opposes the directional control field winding 15c and regulates the terminal voltage of the supply generator 12. The voltage control field winding 15d obtains its excitation from the difference between a voltage derived from the armature voltage of the generator 12 and the voltage of a pilot generator 19. This pilot generator 19 is driven by any suitable means (not shown) at a speed which is substantially constant. It is provided with a separately excited field winding 19a which is excited from a suitable separate source of excitation, such as that represented by the supply lines 16. For the purpose of providing a plurality of different values of the reference voltage with which the voltage derived from the generator 12 is to be compared, a resistor having a plurality of sections 20a, 20b, 20c, and 20d is connected in circuit with the field winding 19a, and a plurality of relays 21, 22, and 23 are provided for individually short circuiting the resistor sections 20a, 20b, and 20c as the master switch 11 is moved through its second, third, and fourth positions in either the forward or reverse directions.

The voltage which is compared with a selected value of reference voltage of the pilot generator 19 is derived from the main supply generator by means of a voltage divider comprising resistor sections 24a, 24b, and 24c which are connected in series relationship across the armature terminals of the supply generator 12.

The voltage control field 15d of the exciting dynamoelectric machine is balanced against the directional field 15c. The latter always tends to force the voltage of the supply generator 12 to increase, while the voltage control field winding 15d opposes this forcing action to bring the excitation down to the value at which the difference or net excitation is just sufficient to sustain the voltage desired. If the flux of the directional control field 15c were unopposed, it would force the excitation of the supply generator 12 to two or three times that required to produce its normal rated voltage. To this forcing action, which is produced by the directional control winding 15c, is added a component of forcing produced by current supplied to the voltage control field winding 15d in the reverse direction from that in which current flows in this winding when it is functioning to regulate the voltage of the generator 12.

For the purpose of limiting the combined forcing action of the two control field windings 15c and 15d for the forward direction of rotation of motor 10 to a reasonably safe value, a resistor 25 is included in circuit with the field winding 15d. A similar resistor 26 performs the same function for the reverse direction of rotation of motor 10. In order not to limit the current flowing in the field winding 15d when the voltage derived from the supply generator 12 exceeds the reference voltage of pilot generator 19 for the forward rotation of motor 10, a relatively low resistance path in parallel with the relatively high resistance 25 is provided. This low resistance parallel path is established by means of contacts 17a on the forward contactor 17 which short circuit the resistor 26 when the forward contactor is closed. A similar low resistance path in parallel with high resistance 26 for the reverse direction of rotation of motor 12 is provided by means of contacts 18a on the reverse contactor 18 which short circuit the resistor 25 when the contactor 18 is closed.

A rectifier 27 in circuit with resistor 26 prevents current from flowing through the low resistance path provided by contacts 17a during the forcing action for the forward direction of rotation of motor 10, and a similar but reversely connected rectifier 28 in circuit with resistor 25 performs a similar function for the reverse direction of rotation of motor 10.

With the foregoing understanding of the elements and their organization in the system, the operation of the system itself will readily be understood from the following detailed description: With the master switch 11 in the central or off position in which it is illustrated, the driving motor 10 is at rest and the supply generator 12 and the pilot generator 19 are generating zero voltages.

Assuming that it is desired to accelerate the motor 10 in the forward direction, the master switch 11 is moved from the central or off position to the first forward position, in which an energizing circuit is completed for the operating coil of the forward contactor 17. This circuit is traced from the positive side of the source 16 through the fingers 11a and 11b of the master switch, bridged by the segments 11g and 11h which are connected together, thence through the operating coil of contactor 17 to the negative side of the source 16. In response to energization, contactor 17 picks up to close its main contacts 17a, 17b, 17c, and 17d, and to open its normally closed contacts 17e. Contacts 17c and 17d in closing connect the directional control field winding 15c of the exciting dynamoelectric machine 15 to the source 16, thereby causing the voltage at the load brushes 15a to build up rapidly to excite the main separately excited field winding 12a of the supply generator 12, and the voltage of the supply generator 12 to rise and to accelerate the motor 10 from rest.

The simultaneous closing of the contact 17b of contactor 17 completes the connection of the main separately excited field winding 19a of the voltage pilot generator 19 to the source 16 with the resistor sections 20a, 20b, 20c, and 20d included in series relationship.

As a result of the excitation of the main separately excited field winding 19a of the pilot generator 19, its voltage rises rapidly to a low value which is determined by the resistance of the resistor sections 20a, 20b, 20c, and 20d.

It may be assumed that the excitation of the supply generator 12 is in such a direction that the polarity of the supply conductor 12b is positive and the polarity of the supply conductor 12c is negative; and it may also be assumed that the excitation of the main separately excited field winding 19a of the pilot generator 19 for the forward direction of rotation of motor 10 is such that the polarity of the brush 19c is positive and the polarity of the brush 19d is negative. The positive brush 19c of the pilot generator 19 is connected through the resistor 25 and the rectifier 26 to the positive terminal of the resistor 24b which constitutes one section of the voltage divider which is connected across the armature terminals of the supply generator 12. One terminal of the differential control field winding 15d of the exciting machine 15 is connected to the negative brush 19d of the pilot generator 19, and the other terminal of the field winding 15d is connected to the negative terminal of the resistor section 24b. Thus, the difference between the terminal voltage of the pilot generator 19 and the voltage drop across the resistor section 24b is applied to the control field winding 15d.

Since the voltage of the pilot generator 19 rises much more rapidly than the voltage of the supply generator 12, it also rises much more rapidly than the voltage drop across the resistor 24b which is derived from the voltage of the supply generator 12. Consequently, current is caused to flow from the positive terminal 19c of the pilot generator 19 through the resistor 25, the rectifier 26, resistor section 24b, control field winding 15d to the negative terminal 19d of pilot generator 19. The rectifier 27 prevents current from flowing through the parallel low resistance path of contacts 17a. The current flow through the field winding 15d is in such a direction that the field winding 15d is energized cumulatively with the field winding 15c. The result of this cumulative excitation of the field windings 15c and 15d is that the voltage at the load brushes of the exciting dynamoelectric machine 15 is caused to rise rapidly, thereby to force the excitation of the main field winding 12a of the supply generator 12. This forcing action of course forces the terminal voltage of the supply generator 12 to rise very rapidly, thereby to produce a rapid acceleration of the motor 10 which is supplied therefrom.

The forcing action which results from the cumulative excitation of the two control field windings 15c and 15d of the exciting dynamoelectric machine 15 can be made as vigorous as desired. If, for example, the directional control field winding 15c is adjusted to have a normal excitation of three times the net excitation that is required to produce the desired terminal voltage of the supply generator 12, the supplementary forcing obtained momentarily as a result of current flowing in the reverse direction through the differential control field winding 15d may momentarily add as much as four or five times net excitation, thereby producing a total of seven or eight times the net excitation required to sustain the normal terminal voltage of the supply generator 12.

As the voltage of the supply generator 12 rises, the voltage drop across the resistor section 24b rises proportionately, thereby diminishing the difference between the voltage drop across the resistor section 24b and the voltage of the pilot generator 19, so that this supplementary forcing action which is produced by this difference voltage gradually decreases and is eliminated entirely when the voltage drop across the resistor section 24b equals the voltage of the pilot generator 19. If the voltage drop across the resistor section 24b just equals the voltage of the pilot generator 19, the net excitation of the control field winding 15d will be zero, and thus the control field winding 15d will not produce any regulating action in the system. However, as soon as the voltage drop across the resistor section 24b exceeds the voltage of the pilot generator 19, current flows from the positive terminal of the resistor section 24b through the rectifier 27, the contacts 17a of forward contactor 17 (in the closed position thereof), the armature of the pilot generator 19 through the field winding 15d to the negative terminal of the resistor section 24b. The current flow thus produced is in such a direction that the excitation of the field winding 15d is differential with respect to the excitation of the field winding 15c. This produces a decrease in the voltage at the load terminals of the exciting dynamoelectric machine 15 which, in turn, causes the terminal voltage of the supply generator 12 to decrease correspondingly. This decrease in the voltage of the supply generator 12 continues until a balanced condition in the system is reached, in which the net excitation of the exciting dynamoelectric machine 15 is just sufficient to sustain the desired voltage of the supply generator 12 and, consequently, the desired speed of the motor 10. Thus, the voltage of the supply generator 12 and the speed of the motor 10 are regulated closely to the reference voltage produced by the pilot generator 19.

Movement of the master switch 11 to the second forward position causes the contactor 21 to pick up and short circuit the resistor section 20a in the circuit of the main separately excited field winding 19a of the pilot generator 19. This increases the reference voltage developed by the pilot generator, and as a result, the voltage of the supply generator 12 and the speed of the motor 10 are forced upward in a manner which is identical with that already described to a new high value corresponding in magnitude to the new value of the reference voltage.

Likewise, on the third and fourth positions of the master switch 11 a similar forcing action takes place which causes the voltage of the supply generator 12 and the speed of the motor 10 to rise rapidly to new values corresponding to the position of the master switch.

The vigorous forcing action which results from the cumulative excitation of the control field windings 15c and 15d of the exciting dynamoelectric machine causes the voltage of the supply generator 12 and the motor 10 to rise so rapidly as to tend to "overshoot" the predetermined desired final values. This tendency to overshoot is counteracted by means of an auxiliary field winding 19b on the pilot generator 19 which is excited from the secondary winding of a transformer 29 of which the primary winding is connected to be excited by the voltage of the supply generator 12. When the voltage of the supply generator 12 is changing, an impulse voltage is induced in the secondary winding of the transformer 29, and this impulse voltage is applied to the auxiliary field winding.

The polarity of the connections of the secondary winding of the transformer 29 to the auxiliary field winding 19b is so chosen that the impulse voltage excites the auxiliary winding differentially with respect to the main separately excited field winding 19a. There is sufficient delay in this counteraction to permit the voltage of the pilot generator to rise very rapidly to about 80 per cent of its final value, as determined by the position of the master switch 11, and thereafter to build up slowly to the final sustained value. Consequently, the voltage derived from the supply generator 12 has an opportunity to overtake the voltage of the pilot generator and to reverse the excitation of the field winding 15d of the exciting dynamoelectric machine 15 so that it acts differentially with respect to the directional control field winding 15c. This results in a reduction of the excitation of the supply generator 12 so that its voltage and the speed of the motor 10 level off at the value which it is intended to sustain without any overshooting action.

Acceleration of the motor 10 in the reverse direction is brought about by movement of the master switch 11 to a selected position in the reverse direction corresponding to the desired speed. For the operation in the reverse direction, the reversing contactor 16 is closed and the forward contactor 17 is open. The polarities of the voltages at the terminals of the exciting dynamoelectric machine 15, the supply generator 12, and the pilot generator 13 will be opposite to those indicated on the drawing. During the forcing action, current will flow through the resistance 26 to the voltage control field winding 15d of exciting dynamoelectric machine 15, and rectifier 28 will prevent current flow through the parallel low resistance path of contacts 16a. In all other respects the operation in the reverse direction is identical with the previously described operation in the forward direction.

Although in accordance with the provisions of the Patent Statutes this invention is described as embodied in concrete form and the principle thereof is explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. In combination, a main dynamoelectric machine provided with an armature and a field winding, means for deriving a voltage from said armature, a source of reference voltage, means for exciting said field winding comprising a dynamoelectric machine provided with a control field winding, electrical connections for applying the difference of said voltages to said control field winding to excite said control field winding to force the excitation of said main machine when said derived voltage is less than said reference voltage and to reduce the excitation of said main machine when said derived voltage exceeds said reference voltage, a relatively high resistance path and a relatively low resistance path included in parallel in said connections, and means for preventing current from flowing in said low resistance path during said forcing action.

2. In combination, a main dynamoelectric machine provided with an armature and a field winding, means connected across the terminals of said armature for deriving a voltage from the voltage across said armature, a source of reference voltage, means for exciting said field winding comprising a dynamoelectric machine provided with a control field winding, electrical connections including parallel relatively high and relatively low resistance paths for applying the difference of said voltages to said control field winding to excite said control field winding to force the excitation of said main machine when said derived voltage is less than said reference voltage and to reduce the excitation of said main machine when said derived voltage exceeds said reference voltage, and a unidirectional conducting device in said low resistance path to prevent the flow of current through said low resistance path in a direction to effect forcing of the excitation of said main dynamoelectric machine.

3. In combination, a main dynamoelectric machine provided with an armature and a field winding, means for deriving a voltage from said armature, a pilot dynamoelectric machine for generating a reference voltage, means for exciting said field winding comprising a dynamoelectric machine provided with a control field winding, electrical connections for applying the difference of said voltages to said control field winding to control said exciting machine to force the excitation of said main machine when said derived voltage is less than said reference voltage and to reduce the excitation of said main machine when said derived voltage exceeds said reference voltage, and means for preventing said forcing action from causing the voltage of said main machine to exceed a predetermined value comprising a field winding on said pilot machine and a transformer having its primary winding connected to be energized by the voltage of said main machine and having its secondary winding connected to said pilot machine field winding.

4. In combination, a main dynamoelectric machine having an armature and a field winding, means connected across the terminals of said armature for deriving a voltage from the voltage across said armature, a source of reference voltage, a dynamoelectric machine for exciting said field winding, and provided with a main control field winding and with a second control field winding connected to be excited cumulatively with said main control field winding by the difference of said voltages to control said exciting dynamoelectric machine to force the excitation of the field winding of said main dynamoelectric machine when said reference voltage exceeds said derived voltage and to be excited differentially with respect to said control field winding when said derived voltage exceeds said reference voltage to control said exciting dynamoelectric machine to reduce said derived voltage.

5. In combination, a main dynamoelectric machine provided with an armature and a field winding, a source of reference voltage, means for deriving a voltage from said armature, a dynamoelectric machine for exciting said field winding provided with a main control field winding and a second control field winding, connections from said source and said voltage deriving means to said second field winding providing for exciting said second field winding cumulatively with said main control field winding when said derived voltage is less than said reference voltage, to cause said second machine to force the excitation of said main machine, a resistance included in said connections for limiting said forcing action, additional connections including a relatively low resistance path in parallel with said resistance for exciting said second field winding differentially with said control field winding when said derived voltage exceeds said reference voltage to cause said exciting machine to reduce the excitation of said main machine, and a unidirectional conducting device in said low resistance path to prevent the flow of current through said low resistance path in the direction to effect forcing of the excitation of said main machine.

6. In combination, a main dynamoelectric machine provided with an armature and a field winding, means for deriving a voltage from said armature, a source of reference voltage, means for exciting said field winding comprising a dynamoelectric machine provided with a main directional control field winding and a second control field winding, reversing switching means for said directional control field winding to provide for excitation in either direction, electrical connections for exciting said second control field winding cumulatively with said directional control field winding when said derived voltage is less than said reference voltage to force the excitation of said main machine and differentially with respect to said directional control winding when said derived voltage exceeds said reference voltage to reduce the excitation of said main machine, a pair of resistances included in parallel in said connections, means for selectively rendering said resistances ineffective thereby to provide alternate high and low resistance paths, a rectifier included in circuit with one of said resistances and a reversely connected rectifier connected in circuit with the other of said resistances for preventing the flow of current through a low resistance path during said forcing action irrespective of the polarities of said reference and derived voltages.

CLAUDE B. HUSTON.